(12) United States Patent
Lin et al.

(10) Patent No.: US 7,043,714 B2
(45) Date of Patent: May 9, 2006

(54) METHOD, SYSTEM, AND PROGRAM FOR USING OBJECTS IN DATA STORES DURING EXECUTION OF A WORKFLOW

(75) Inventors: Jy-Jine James Lin, Cupertino, CA (US); Wayne F. Miller, Cary, NC (US); Alan Tsu-I Yaung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 09/894,413

(22) Filed: Jun. 28, 2001

(65) Prior Publication Data

US 2003/0005406 A1    Jan. 2, 2003

(51) Int. Cl.
G06F 9/44 (2006.01)
(52) U.S. Cl. ..................................... 717/102
(58) Field of Classification Search ................ 717/102; 705/8
See application file for complete search history.

(56) References Cited

U.S. PATENT DOCUMENTS

| | | |
|---|---|---|
| 5,301,320 A | 4/1994 | McAtee et al. |
| 5,535,322 A | 7/1996 | Hecht |
| 5,572,673 A | 11/1996 | Shurts |
| 5,596,744 A | 1/1997 | Dao et al. |
| 5,596,750 A | 1/1997 | Li et al. |
| 5,634,053 A | 5/1997 | Noble et al. |
| 5,634,127 A | 5/1997 | Cloud et al. |
| 5,644,768 A | 7/1997 | Periwal et al. |
| 5,721,912 A | 2/1998 | Stepczyk et al. |
| 5,721,913 A | 2/1998 | Ackroff et al. |
| 5,734,837 A | 3/1998 | Flores et al. |
| 5,745,683 A | 4/1998 | Lee et al. |
| 5,745,687 A | 4/1998 | Randell |
| 5,752,027 A | 5/1998 | Familiar |

(Continued)

FOREIGN PATENT DOCUMENTS

EP    982675    8/1999

(Continued)

OTHER PUBLICATIONS

U.S. Appl. No. 09/894,074, filed on Jun. 28, 2001, entitled, "Method, System, and Program for Generating a Workflow", invented by WF Miller and AT Yaung.

(Continued)

Primary Examiner—John Chavis
(74) Attorney, Agent, or Firm—David W. Victor; Konrad Raynes & Victor LLP

(57) ABSTRACT

Provided is a method, system, and program for performing an Input/Output (I/O) operation on an object during execution of a workflow comprised of nodes. A plurality of objects are stored in one of multiple data stores, wherein each object is identified within the data store with a first object identifier. A workflow packet references at least one object with a second object identifier, wherein the second object identifier indicates one of the data stores and the first object identifier of the referenced object in the data store. An I/O request for one target object referenced by one second object identifier in the workflow packet is received from one node. A determination is made from the second object identifier for the target object the data store and the first object identifier of the target object. The I/O request is performed on the target object at the determined first object identifier in the determined data store.

36 Claims, 12 Drawing Sheets

U.S. PATENT DOCUMENTS

| | | | |
|---|---|---|---|
| 5,774,661 | A | 6/1998 | Chatterjee et al. |
| 5,790,789 | A | 8/1998 | Suarez |
| 5,794,250 | A | 8/1998 | Cariño, Jr. et al. |
| 5,826,086 | A * | 10/1998 | Arima et al. ............... 717/105 |
| 5,826,239 | A | 10/1998 | Du et al. |
| 5,860,066 | A | 1/1999 | Rouse |
| 5,864,843 | A | 1/1999 | Cariño, Jr. et al. |
| 5,873,083 | A | 2/1999 | Jones et al. |
| 5,892,905 | A | 4/1999 | Brandt et al. |
| 5,913,214 | A | 6/1999 | Madnick et al. |
| 5,926,636 | A | 7/1999 | Lam et al. |
| 5,930,512 | A | 7/1999 | Boden et al. |
| 5,937,388 | A | 8/1999 | Davis et al. |
| 5,951,649 | A | 9/1999 | Dobbins et al. |
| 5,960,420 | A | 9/1999 | Leymann et al. |
| 5,987,422 | A | 11/1999 | Buzsaki |
| 5,991,733 | A | 11/1999 | Aleia et al. |
| 6,006,193 | A * | 12/1999 | Gibson et al. ................. 705/8 |
| 6,012,067 | A | 1/2000 | Sarkar |
| 6,044,378 | A | 3/2000 | Gladney |
| 6,061,667 | A | 5/2000 | Danford-Klein et al. |
| 6,065,009 | A | 5/2000 | Leymann et al. |
| 6,073,109 | A | 6/2000 | Flores et al. |
| 6,073,111 | A | 6/2000 | Leymann et al. |
| 6,115,646 | A | 9/2000 | Fiszman et al. |
| 6,151,583 | A | 11/2000 | Ohmura et al. |
| 6,170,002 | B1 * | 1/2001 | Ouchi ........................ 709/206 |
| 6,226,641 | B1 | 5/2001 | Hickson et al. |
| 6,278,977 | B1 | 8/2001 | Agrawal et al. |
| 6,308,163 | B1 | 10/2001 | Du et al. |
| 6,338,074 | B1 | 1/2002 | Poindexter et al. |
| 6,349,238 | B1 | 2/2002 | Gabbita et al. |
| 6,430,538 | B1 | 8/2002 | Bacon et al. |
| 6,453,320 | B1 * | 9/2002 | Kukura et al. .......... 707/103 R |
| 6,487,607 | B1 | 11/2002 | Wollrath et al. |
| 6,539,396 | B1 * | 3/2003 | Bowman-Amuah ..... 707/103 R |
| 6,578,006 | B1 | 6/2003 | Saito et al. |
| 6,606,740 | B1 | 8/2003 | Lynn et al. |
| 6,665,674 | B1 | 12/2003 | Buchanan et al. |
| 6,665,814 | B1 | 12/2003 | Hobson et al. |
| 6,681,243 | B1 | 1/2004 | Putzolu et al. |
| 6,691,299 | B1 | 2/2004 | Hart et al. |
| 6,721,713 | B1 | 4/2004 | Guheen et al. |
| 6,769,113 | B1 | 7/2004 | Bloom et al. |
| 6,769,124 | B1 | 7/2004 | Schoening et al. |
| 6,816,902 | B1 | 11/2004 | Bandat et al. |
| 6,853,974 | B1 | 2/2005 | Akifuji et al. |
| 6,877,153 | B1 * | 4/2005 | Konnersman ............... 717/100 |
| 6,920,456 | B1 | 7/2005 | Lee et al. |
| 2002/0022485 | A1 * | 2/2002 | Kolsky et al. .............. 455/452 |
| 2002/0032783 | A1 | 3/2002 | Tuatini |
| 2002/0038357 | A1 | 3/2002 | Haverstock et al. |
| 2002/0040312 | A1 * | 4/2002 | Dhar et al. ..................... 705/8 |
| 2002/0059411 | A1 | 5/2002 | Barnhouse et al. |
| 2002/0103811 | A1 | 8/2002 | Fankhauser et al. |
| 2002/0120685 | A1 | 8/2002 | Srivastava et al. |
| 2002/0143949 | A1 | 10/2002 | Rajarajan et al. |
| 2003/0023472 | A1 | 1/2003 | Lee et al. |
| 2003/0023662 | A1 | 1/2003 | Yaung |
| 2003/0023728 | A1 | 1/2003 | Yaung |
| 2003/0023773 | A1 | 1/2003 | Lee et al. |
| 2003/0033415 | A1 | 2/2003 | Graylin et al. |
| 2003/0131075 | A1 | 7/2003 | Bear et al. |
| 2004/0015821 | A1 * | 1/2004 | Lu et al. ..................... 717/103 |

FOREIGN PATENT DOCUMENTS

| | | |
|---|---|---|
| JP | 10-081425 | 3/1998 |
| JP | 10-326314 | 12/1998 |
| JP | 11-003298 | 1/1999 |
| JP | 11-175644 | 7/1999 |
| JP | 11-249983 | 9/1999 |
| WO | 9963469 | 12/1999 |
| WO | 0014618 | 3/2000 |

OTHER PUBLICATIONS

U.S. Appl. No. 09/894,076, filed on Jun. 28, 2001, entitled, "Method, System, and Program for Executing a Workflow", invented by AT Yaung.

Galtzur, Z. et al. "Managing Workflow Using Database Techniques", IBM Technical Disclosure Bulletin, vol. 39, No. 8, Aug. 1996, pp. 199-201.

Yong, Y.M. "Template-Driven Document-Exchange Specification", IBM Technical Disclosure Bulletin, vol. 39, No. 11, Nov. 1996, pp. 173-178.

Duscher, R. et al. "Audit Trail Support For Program Activity Implementations of Workflow Management Systems", 1994, pp. 1-4.

Dr. Leymann, F. et al. "Context Support For Program Activity Implementations of Workflow Management Systems", 1994, pp. 1-4.

Sluiman, H. "A Relational Schema to Support Task and Workflow, Data Collection and Analysis", pp. 1-3.

IBM Corp. "Chapter 4. Introducing Enterprise Information Portal Workflow" from *Managing Enterprise Information Portal*, IBM Enterprise Information Portal for Multiplatforms, Version 7.1, #SC27-0875-00, Product No. 5697-G29 and 5697-G31, Aug. 2000, pp. iii-iv and pp. 39-45.

IBM, Corp. "Concepts and Architecture" IBM MQSeries Workflow, Version 3.3, #GH12-6285-03, Product No. 5697-FM3, Mar. 2001, pp. iii-58.

IBM, Corp. "User's Guide for the Work Management Builder" IBM ImagePLus Workfolder Application Facility or AS/400, Version 4 Release 1, #SC34-4587-00, Program No. 5733-A18, Sep. 1997, pp. iii-119.

Su, SYW et al. "An Extensible Knowledge Base Mangement System for Supporting Rule-based Interoperability among Heterogeneous Systems" 1995, ACM # 0-89791-812-6/95/11, pp. 1-10.

Johansson, SE et al. "Expert Workflow, Building Knowledge-Based Workflow Systems with Object Technology", 1997, pp. 45-49.

Leymann, F. et al. "Workflow-based Applications" [online], vol. 36, No. 1—Application Development, pp. 1-22, plus 9 pages of linked Figures (drawings), and 2 pages of "Cited Reference and Notes". [Retrieved on May 17, 2001]. Retrieved from the Internet at <URL: http://www.research.ibm.com/journal/sj/361/leymann.html>.

Vossen, G. "The WASA2 Object-Oriented Workflow Management Systems", 1999, ACM # 1-58113-084-8/99/05.

Mahon, C., "Workflow Management in the Internet Age", Aug. 1997.

Nyberg, K., "Workflow Definition Languages", *Tik-76.273 Seminar on Database Management*, Nov. 2000.

Reinwald, B. & C. Mohan, "Structured Workflow Management with Lotus Notes Release 4", *Proceedings of the 41st IEEE Computer Society International Conference (CompCon)*, Feb. 1996, pp. 451-457.

Trammell, K., "Work Flow Without Fear: Six Reasons Why Work Flow Fails, and What you Can do About It", [online], Apr. 1996, Retrieved from the Internet at <URL: http://www.byte.com/art/9604/sec8/art1.htm>.

Ghoudhury, G.S., C. Requardt, I. Fujinaga, T. Dilauro, E.W. Brown, J.W. Warner, and B. Harrington, "Digital Workflow Management: The Lester S. Levy Digitized Collection of Sheet Music", [online], © 2000 *First Monday*, [Retrieved on Mar. 17, 2005], retrieved from the Internet at <URL: http://firstmonday.org/issues/issue5_6/choudhury/index.html>.

Gulcu, C. (Ed.), "Suitable Interface Adaptor (Workflow Module)", *Cross-Organisational Workflow: Crossflow*, ESPRIT E/28635, Dec. 1999, pp. 1-12.

Hudgins, J and L.A. Macklin, "New Materials, New Processes: Implementing Digital Imaging Projects into Exisiting Workflow", *Library Collections, Acquisitions, & Technical Services*, 2000, No. 24, pp. 189-204.

IBM Corporation, "Method for Testing Program Activity Implementations of Workflow Management Systems", *IBM Research Disclosure*, No. 408186, Apr. 1998, pp. 503-505.

IBM Corporation, "Non-Destructive Annotation of Documents in an Image Processing Environment", *IBM Research Disclosure*, No. 430191, Feb. 2000, pp. 404-408.

IBM Corporation, "Runtime Transaction Managment in a Transaction Service", *IBM Research Disclosure*, No. 416150, Dec. 1998, pp. 1720-1721.

Spitzer, T., "Forms, Workflow, and the Web", [online], [Retrieved on Mar. 17, 2005], retrieved fro the Internet at <URL: http://www.webtechniques.com/archieves/1999/10/busi/>.

\* cited by examiner

PID

METHOD, SYSTEM, AND PROGRAM FOR USING OBJECTS IN DATA STORES DURING EXECUTION OF A WORKFLOW

RELATED APPLICATIONS

This application is related to the following copending and commonly assigned patent filed on the same date herewith, which are incorporated herein by reference in their entirety:

"Method, System, and Program for Generating a Workflow", having U.S. application Ser. No. 09/894,074; and "Method, System, and Program for Executing a Workflow", having U.S. application Ser. No. 09/894,076.

BACKGROUND OF THE INVENTION

1. Field of the Invention

The present invention relates to a method, system, and program for using objects in data stores during execution of a workflow.

2. Description of the Related Art

A workflow program allows businesses and other organizations to define their business operations as a computer model known as a workflow. A workflow defines a series of processes to be performed by users at a client computer. The user activities at the client computers may involve updating an electronic form, reviewing information, etc. After one user in the workflow performs a specified action, the work item or other information is then routed to one or more further nodes where further action may be taken. For instance, an on-line purchase of a product may involve numerous steps, such as receiving the customer order, routing the customer order to the credit department to process the bill and then routing the order to the shipment department to prepare the shipment. Once the shipment is prepared, the product may be shipped and information on the purchase is then transferred to the customer service department to take any further action. Each of these processes may be defined as nodes in a workflow. A workflow program would then route the customer order to the business agents designated to handle the job. For instance, the initial order would be received by the order department and then routed to a person in shipping and billing. Once the bill and package are prepared, a further invoice may be forwarded to shipping. After shipping sends the package, the shipping agent may then enter information into the invoice and forward the electronic invoice to customer service for any follow up action.

A workflow is designed using workflow software, such as the International Business Machines (IBM) MQSERIES** Workflow software product. A process modeler is a person that analyzes the business operations, determines how the information related to the operations is routed electronically to client computers, and then defines a workflow model of the operations. The workflow model may be coded in the FlowMark Definition Language (FDL). The workflow model is then imported into a Runtime program that verifies and translates the workflow model into a process template. An instance of the process template can then be invoked to automates the sequence of events defined by the model.

There is a continued need in the art to provide improved techniques for building and utilizing workflow models.

SUMMARY OF THE PREFERRED EMBODIMENTS

Provided is a method, system, and program for implementing a workflow comprised of nodes. A workflow packet is generated that is accessed by users at the nodes in the workflow. A request is received to add one target object in one of the data stores to the packet, wherein each data store includes multiple objects. A determination is made of a first object identifier of the target object that is used to identify the target object in one data store. A second object identifier is generated indicating the data store including the target object and the first object identifier. The generated second object identifier is inserted into the workflow packet, where nodes accessing objects in the workflow packet use the second object identifier to access the target object for use at the node.

In further implementations, the data stores are capable of being different types of data stores and from different vendors Further provided is a method, system, and program for performing an Input/Output (I/O) operation on an object during execution of a workflow comprised of nodes. A plurality of objects are stored in one of multiple data stores, wherein each object is identified within the data store with a first object identifier. A workflow packet references at least one object with a second object identifier, wherein the second object identifier indicates one of the data stores and the first object identifier of the referenced object in the data store. An I/O request for one target object referenced by one second object identifier in the workflow packet is received from one node. A determination is made from the second object identifier of the data store for the target object and the first object identifier of the target object. The I/O request is performed on the target object at the determined first object identifier in the determined data store.

In further implementations, one workflow packet is associated with a plurality of the nodes in the workflow, wherein the nodes submit I/O requests for one or more objects referenced by the second object identifiers in the workflow packet.

In still further implementations, the I/O request comprises a workflow I/O request and each data store is accessed using data store interfaces. Provided is a mapping of workflow I/O requests to the data store interfaces for each of the data stores, wherein each workflow I/O request maps to one or more data store interfaces for each data store. Each data store interfaces for each data that are capable of implementing the workflow I/O request in the data store. A determination is made from the mapping the at least one data store interface for the determined data store that implements the workflow I/O request in the determined data store. The workflow I/O request is performed using the determined at least one data store interface.

Still further, the data stores are capable of comprising different types of data stores from different vendors that utilize different sets of data store interfaces to enable access to objects in the data store. In such case, the mapping enables the workflow I/O requests to be executed across heterogeneous data stores.

The described implementations provide a technique for implementing references to objects dispersed across multiple data stores to allow nodes in a workflow to access the objects in any of the data stores. The described techniques are capable of allowing nodes access to the objects in the different data stores even when the data stores comprise heterogeneous data stores of different types and from different vendors.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
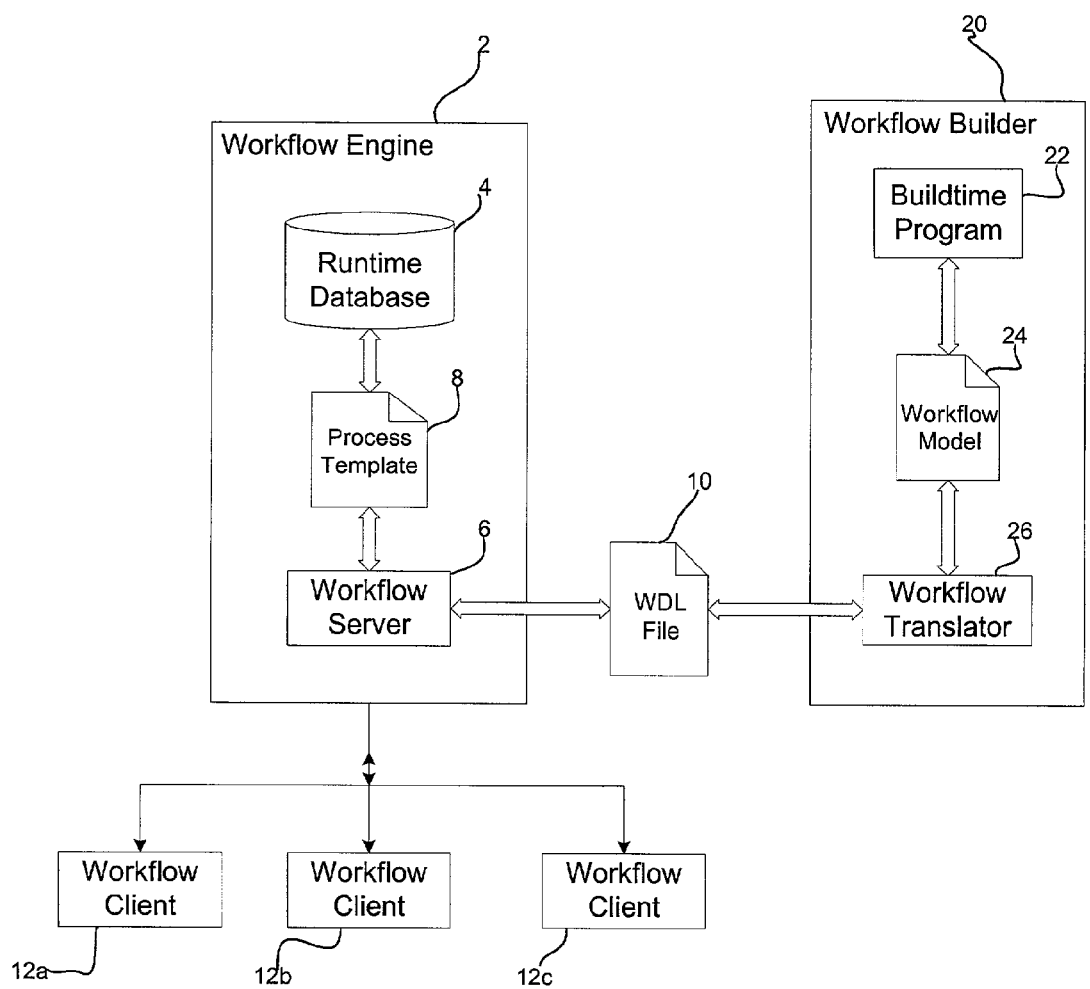
FIG. 1 illustrates a workflow computing environment in which aspects of the invention are implemented.

FIG. 1 illustrates a workflow environment implementation in which the invention is realized. A workflow engine 2 includes a runtime database 4 and a workflow server 6, such as the IBM MQSeries Workflow server. The workflow server 6 is capable of transforming a workflow model coded in a workflow definition language (WDL) file 10, such as FDL, into a process template 8 implemented in the runtime database 4. The runtime database 4 stores database tables that implement the data structures that provide the status and setup information needed for workflow process execution. Whenever the state of a process activity changes, such information is recorded in the runtime database 4. The runtime database 4 may be implemented using any database program known in the art, such as IBM DB2.**

The workflow server 6 coordinates and manages the execution of processes for a defined process template 8. The workflow server 6 executes any programs associated with a process defined for the workflow, interprets the process definitions, creates process instances and manages their execution, manages processes and states, logs events, communicates with users as part of the workflow, etc. The workflow server 6 may include a database client program (not shown) to access and update records related to the workflow being processed maintained in the runtime database 4. The workflow server 6 processing may be distributed across multiple computers to achieve workload balancing.

The workflow clients 12a, b . . . n represent the client computers that execute workflow application program interfaces (APIs) to perform workflow related actions and activities and return messages to the workflow server 6. The workflow clients 12a, b . . . n thus comprise instances of the workflow code on the client computers that allow users to interface with the executing workflow and the workflow server 6. The workflow server 6 would execute activity programs as part of executing the workflow and transmit messages and data to the workflow client 12 to request user action to proceed with the workflow. The actions associated with the nodes and executed by the workflow server 6 may comprise Java servlets. The workflow client 12 may comprise a Web browser capable of executing Java scripts transferred from the Java servlet executing on the workflow server 6. Further, details on implementations and interactions of the workflow server 6 and client 12 are described in the IBM publication "IBM MQSeries Workflow: Concepts and Architecture, Version 3.3", IBM document no. GH12-6285-03 (March, 2001), which publication is incorporated herein by reference in its entirety.

A workflow builder 20 comprises a system including a buildtime program 22 that implements a plurality of graphical user interface (GUI) panels in which a user may define the components of a workflow model 24. A workflow translator 26 converts the workflow model 24, with the defined workflow components, into a workflow definition language (WDL) file 10 that implements the workflow model 24. The workflow definition language (WDL) may comprise the FlowMark Definition Language (FDL), Workflow Process Definition Language (WPDL) or any other workflow definition language known in the art that is used to define workflows. The workflow translator 24 would transfer the WDL file 10 to the workflow server 6 to transform into a process template 8 in the runtime database 4 in a manner known in the art.

The workflow engine 2, and each of the program components therein, such as the runtime database 4 and workflow server 6, may be implemented in one or more computing machines. The workflow clients 12 which provide the workflow interface to users may be implemented on one or more client machines. The workflow builder 20, including the buildtime program 22 and workflow translator 26 programs, may be implemented on one or more computing machines. Any portion of the workflow engine 2, workflow builder 20, and/or workflow client 12, and program components therein, may be implemented on the same computing machines or separate machines. The computing machines used to implement the workflow engine 2, workflow clients 12, and workflow builder 20 may comprise any computing device known in the art, such as a server, workstation, mainframe, personal computer, laptop computer, hand held computer, telephony device, etc.

As discussed, the buildtime program 22 generates a series of graphical user interface (GUI) panels through which the user may define a workflow. Before utilizing the buildtime program 22, the process modeler would plan the workflow and analyze the work the business performs, how it is performed, and by whom. The process modeler may then develop a workflow to generate a final product, which may comprise the result of the effort of a single business unit or the cumulative efforts of multiple users and units within an organization. To produce the final product, a workflow packet comprised of one or more documents would transfer through various user work stations in the company defined as nodes in the workflow to require the user associated with such node to handle and process and forward to another user to handle. A document is comprised of a multimedia item that has digital content.

For instance, an insurance company may have to process numerous documents related to an insurance claim, such as photographs, appraisals, expert reports, etc. Employees may spend a substantial amount of time sorting through documents and associating the documents with particular claims. In the workflow model, all the documents related to a single claim would be part of a work packet that may move through various user stations to review and process. The workflow would comprise the flow of work and actions that are performed on the documents or workflow packet by multiple users in the system.

The workflow defines the sequence and boundaries of how the work is performed with respect to the documents in the workflow packet, and any restrictions on the order in which documents in the workflow packet must be processed. For instance, before the claim can proceed to a further step, a claims adjuster might be required to ensure that certain documents are included in the workflow packet for the claim before the workflow packet can proceed to further nodes in the workflow, e.g., determining the amount of compensation.

In workflow terminology, a worklist is a queue of work items. Each work item comprises a unit of work for a node in the workflow that is performed by the users associated with that node. Each work item may be associated with one work packet, which comprises documents or objects that are processed during the work defined for that work item. When a user at one node accesses the work item to perform the work defined therein, that workitem is locked, thereby preventing others at that node from accessing the work item.

A worklist, which is a queue of work for the users of the organization to perform with respect to the workflow packet. The work items within the worklist can be handled by any of the employees/users assigned to the worklist. An action list defines the actions that a user can perform on the work packet objects associated with the work item, such as selections or data that may be entered in the work packet. For example, an adjuster in the claim process workflow can select an option to continue consideration of the claim if it appears valid or select an option to reject the claim. The workflow further consists of the paths defined as the connections between nodes which indicate the order of execution of nodes in the workflow.

Figure 2:
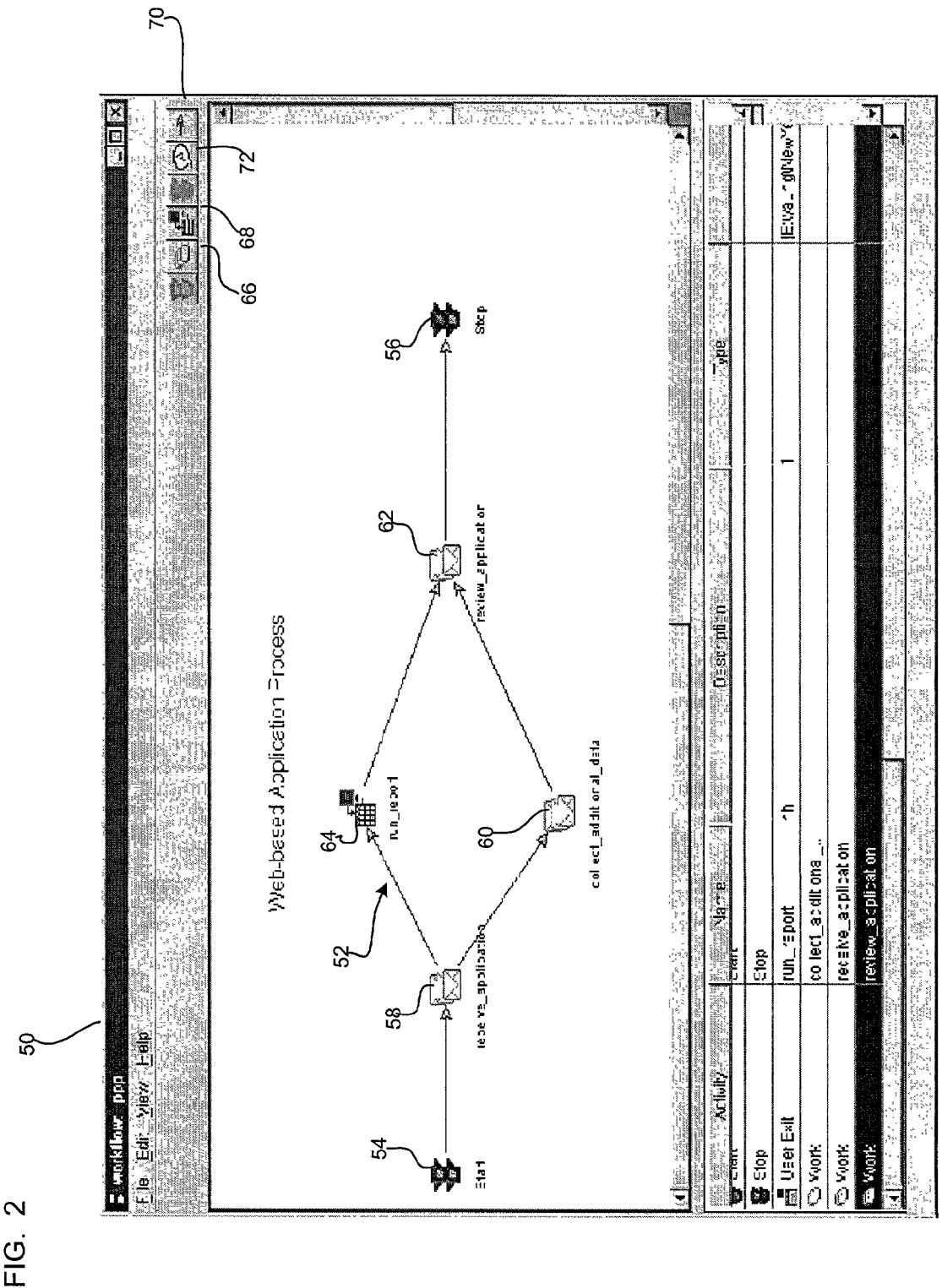
FIGS. 2–7 illustrate graphical user interface (GUI) panels used to design a workflow model in accordance with implementations of the invention.

FIG. 2 illustrates an example of a GUI panel 50 displayed by the buildtime program 22 illustrating a workflow 52 defined by a process modeler using workflow icons available in the GUI panel 50. The workflow 52 has a start icon 54, displayed as an icon having a green light, that indicates the start of the workflow and an end icon 56 is defined as indicating an end of the workflow. The start 54 and end 56 icons may be added automatically to the workflow 52 when the process modeler begins working on the workflow model 24. Between the start 54 and end 56 icons are a plurality of work nodes 58, 60, and 62, displayed as three stacked envelopes, that associate work items on the worklist and an action list for a specific point in a workflow 52. A work node 58, 60, 62 is a point in the workflow where work is performed. A user exit icon 64 indicates a user exit node where an application program is called to perform a background operation. Certain user exits may require that the called application program provide data to a work item in the workflow. Alternatively, the user exit may call an application program that may execute in the background, such as update a database, print reports, etc., while the workflow proceeds to further nodes.

As mentioned, the start 54 and end 56 icons may be automatically added to the workflow 52 when the user starts a blank workflow model 24. The user may move the start 54 and end 56 icons to any location on the drawing surface. The user may select the control icons 66 and 68 to add work and user exit nodes, respectively, to the workflow. Control icon 70 is used to define a path between two nodes defining the sequence in which the nodes are processed, and the order in which the work items are processed. The path lines, which are shown as the arrows between the start 54, end 56, work and user exit icons 58, 60, 62, and 64 illustrate the operation flow from one node to another.

Once the process modeler has defined the general layout of a workflow using the control icons 66, 68, 70, and 72, as shown in the workflow 52 in FIG. 2, the process modeler may then use additional GUI panels shown in FIGS. 3–7 of the buildtime program 22 to associate particular users, actions and work items with the nodes.

Figure 3:
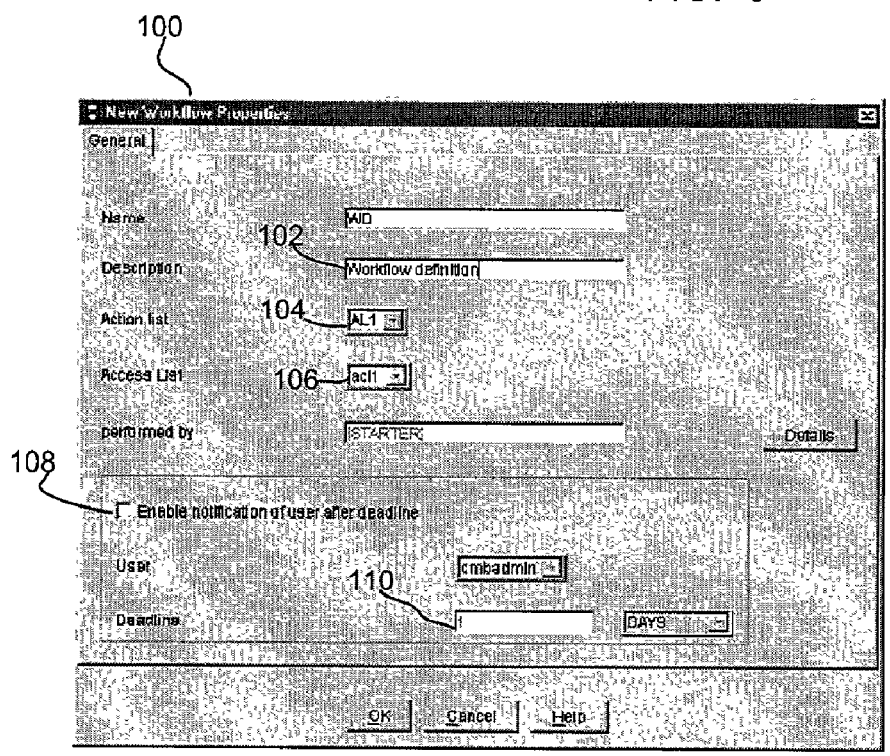

FIG. 3 illustrates a GUI panel 100 used to define properties for a new workflow being defined in the panel 50 of FIG. 1. A description field 102 includes a description of the workflow being defined. An action list 104 is a list the actions that can be invoked at the nodes in the defined workflow. The actions may comprise programs that are executed at a particular node. In certain implementations, the actions comprise Java methods that the workflow server 6 executes when control proceeds to the node with which the method is associated. The program modeler would associate the actions in the action list with particular nodes. An access list 106 defines a mapping of users that can be assigned to nodes to perform the action associated with such node. Selection of the enable notification checkbox 108 causes a message to be sent to a specified user if the user associated with a node has not performed the action defined for the node within a specified time frame indicated in the deadline field 110.

Figure 4:
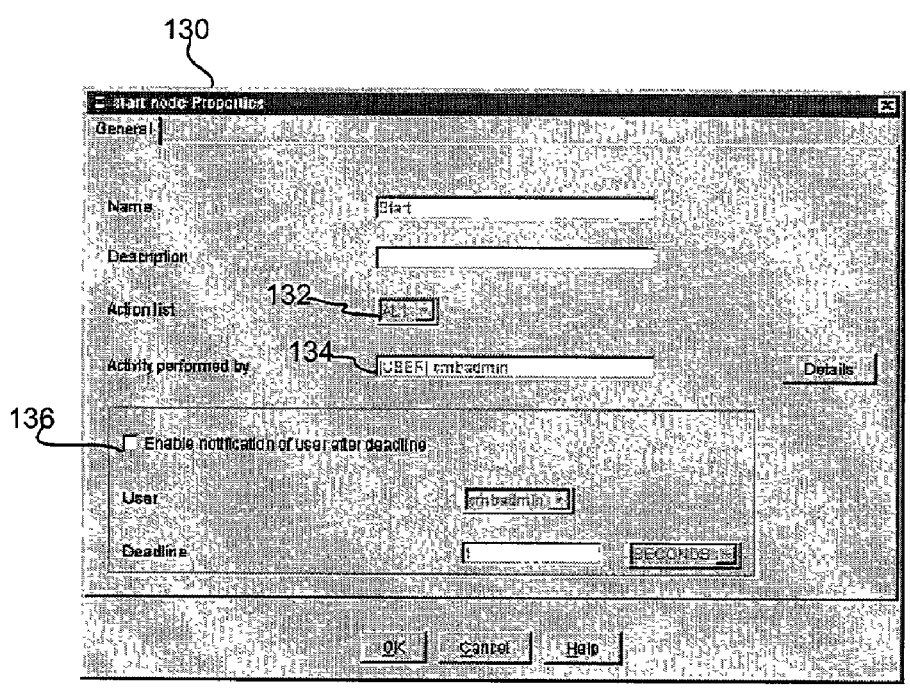

After defining the properties for the new workflow and placing icons in the drawing area and path arrows to define the workflow, the user would then use the GUI panels shown in FIGS. 4–7 to associate actions and a user with each node, where the associated user performs the associated action when the workflow server 6 processes the node according to the workflow. FIG. 4 illustrates a start node panel 130 in which the process modeler defines the action and user associated with the start node 54 in the workflow, i.e., the first user that will perform the action with respect to the item at the beginning of the workflow. The process modeler would select an action from the action list in the action field 132 and specify the user to perform the action at the start node in the user field 134. The enable notification of deadline checkbox 136 may be selected to notify the user associated with the start node that a deadline has passed during which the user designated action for that node was not completed. Anyone, such as an administrator, user associated with node, or other user on the access list may receive the notification of the missed deadline for the start node 54.

Figure 5:
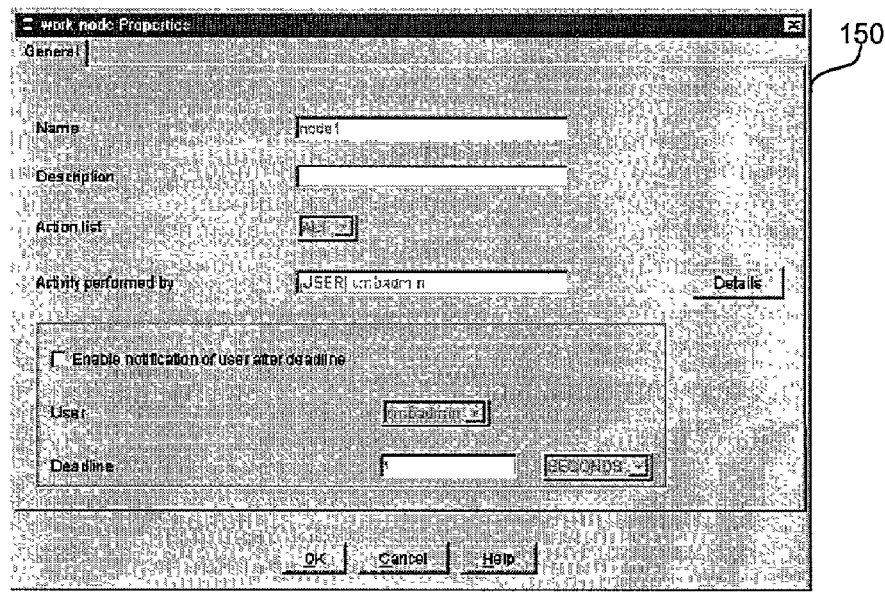

FIG. 5 illustrates the property GUI panel 150 used to associate one or more actions and a user with one of the work nodes in the workflow, such as work nodes 58, 60, and 62 in FIG. 2. The work nodes defined by the user may comprise a decision point node, collection point node, document node, and assign value node. A decision point node causes the workflow to proceed along a branch of execution based on selection by the user or some other action taken by an external application called at a previous work node. For instance, the path taken to the next node in the workflow may vary if the claim adjuster selects to reject the claim as opposed to approving the claim. A collection point node is a work node where certain documentation is gathered and added to the work packet. The collection node holds and manages work packages that cannot be processed completely until additional information is received. A document node represents a document in the workflow.

Figure 6:
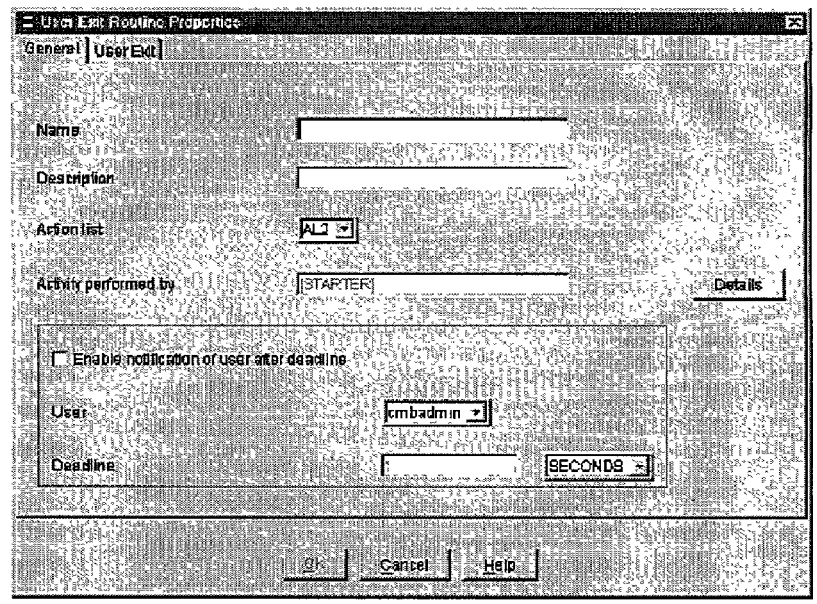
Figure 7:
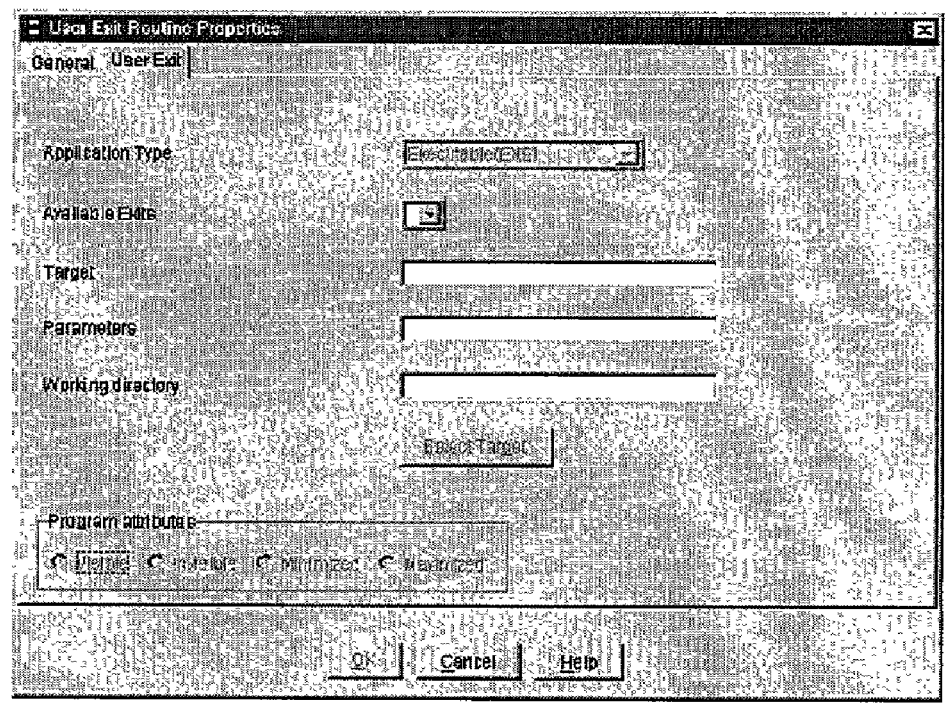

FIGS. 6 and 7 illustrates the property panels used to define a user exit node that calls an external application to perform operations and perhaps transfer data back to the node for further processing. A user exit is a point in the workflow execution where a user exit routine can be given control, and transfer data back and forth from the external application to the node upon the occurrence of a user-specified event. Further, the user exit node may call an external application program to perform background operations while the workflow proceeds to the next work node.

Using all the above described panels shown in FIGS. 2–7, the process modeler can design a workflow model specifying work nodes and the actions associated with the work nodes, as well as the paths between the work nodes. If two paths lead into a node, such as the case with work node 62 in FIG. 2, then the workflow will only proceed to the action specified for that next node once the actions associated with the two preceding nodes has completed. Before the user may use the buildtime program 22, the user must define the access control lists, users, user groups, actions, action lists and worklist in a manner known in the art using application programming interfaces (APIs). The worklist would provide those work items assigned to users, indicating the work items a user may access when performing actions at a node.

Figure 8:
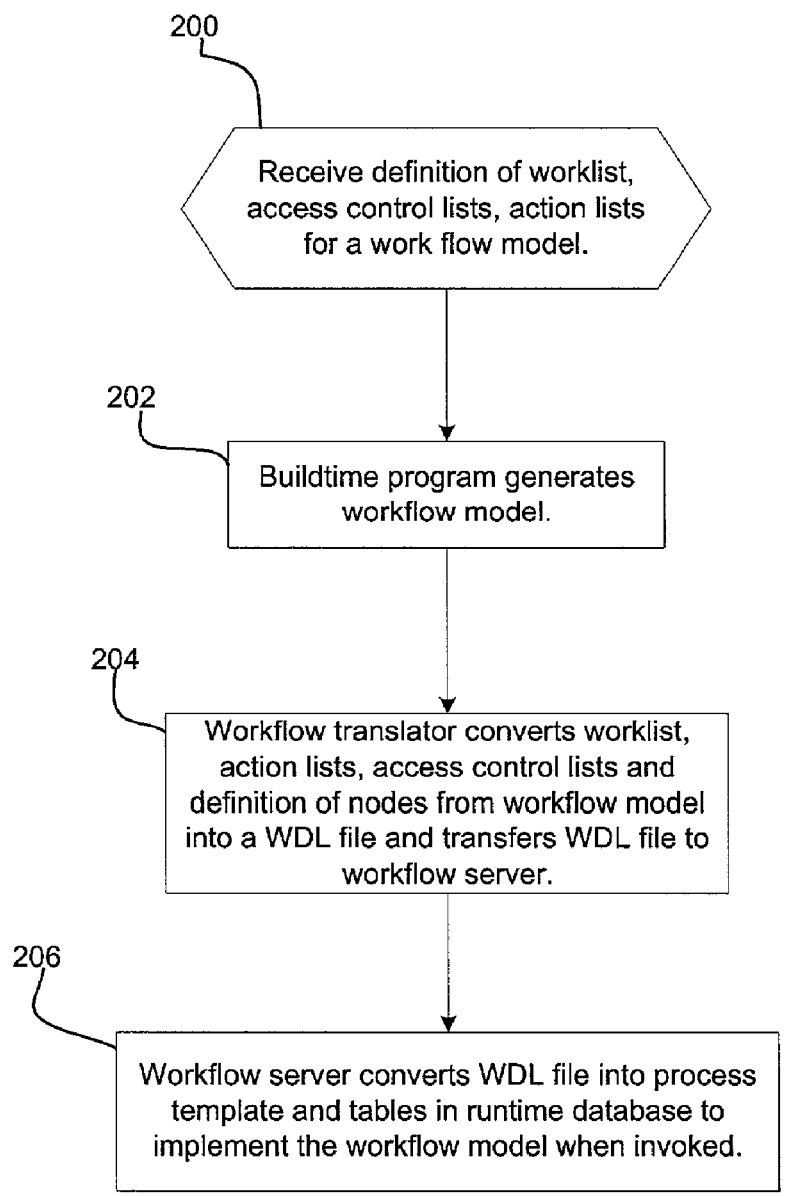
FIG. 8 illustrates logic implemented in a buildtime program to generate a workflow model and worfklow definition language (WDL) file in accordance with implementations of the invention.

FIG. 8 illustrates logic implemented in the workflow builder 20 and workflow engine 2 to generate a workflow in the runtime database 4 that may be invoked and executed. Control begins at block 200 with the buildtime program 22 receiving defined work lists, access control lists, and action lists. The buildtime program 22 and GUI panels therein are then used to generate (at block 202) a workflow model 24 including a plurality of nodes, such as shown in FIG. 2, and paths therebetween defining the order of execution of the nodes in the workflow. At block 204, the workflow translator 26 converts the workflow model 24 and the defined workflow, access lists, action lists, etc. into a WDL file coded using a workflow definition language known in the art and transfers the WDL file 10 to the workflow server 6. The workflow server 6 then builds the process template 8, including tables and other data structures, in the runtime database 4 that are used to implement the workflow model defined using the buildtime program 22.

Figure 9:
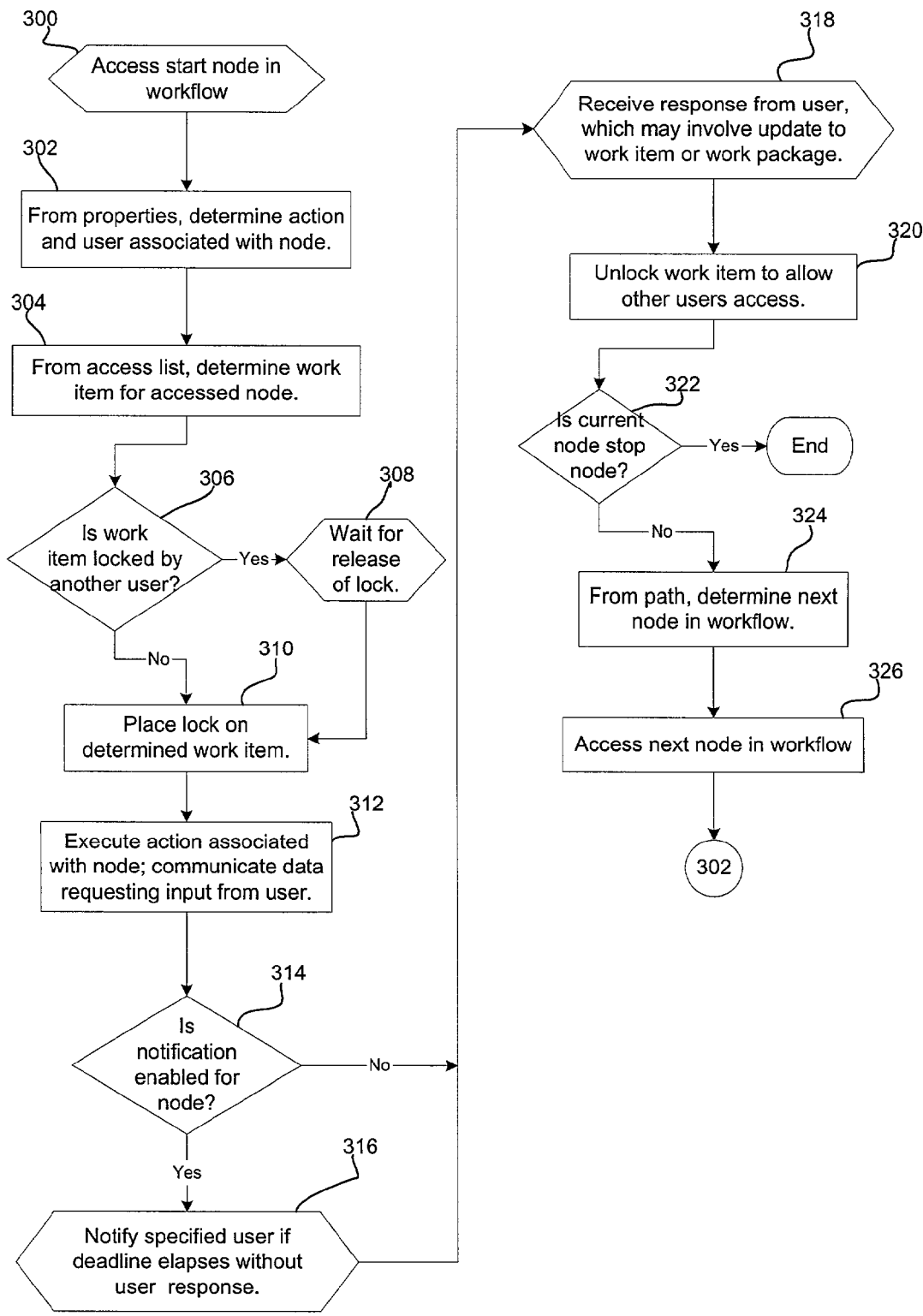
FIG. 9 illustrates logic performed by a workflow server to execute a workflow in accordance with implementations of the invention.

In certain implementations, the workflow model 24 defined using the buildtime program 22 is document centric in that the actions performed at the node concern the processing of work packages that may comprise any content or object that is processed and routed through the workflow. FIG. 9 illustrates the logic performed by the workflow server 6 to execute the workflow logic generated using the buildtime program 22 GUI panel 50 shown in FIG. 2. When a user invokes a workflow stored in the runtime database 4, the workflow server 6 accesses (at block 300) the start node of the invoked workflow by interacting with the runtime database 4 in a manner known in the art. From the properties defined for that node, the workflow server 6 determines (at block 302) the actions and user associated with the node. The workflow server 6 further processes (at block 304) the access list defined for the workflow to determine the work item for the accessed node. If (at block 306) the determined work item currently accessed in the workflow is locked by another user at that node, then the workflow server 6 waits (at block 308) for the lock on the work item(s) to be released. If the work item is not locked or after the lock is released, control proceeds to block 310 where the workflow server 6 places a lock on the determined work item. The workflow server 6 then executes (at block 312) the action associated with the node and communicates data to the workflow client 12 of the determined user requesting user action.

If (at block 314) notification is enabled for the current node and the deadline has passed (at block 316) without receiving a response from the user, then the workflow server 6 notifies the user specified with the enable notification that the deadline has passed. Upon receiving (at block 318) a response from the user, which may comprise entering information, modifying a work item, adding a work item to the work package, selecting an option, etc., the workflow server 6 unlocks (at block 320) the work item(s) previously locked for the user. If (at block 322) the current node is the stop node, then control ends; otherwise, if there are further nodes to process in the workflow, then the workflow server 6 determines (at block 324) from the path from the current node the next node in the workflow and accesses (at block 326) the next node. Control then proceeds back to block 326 to process the next node.

The workflow logic of FIG. 9 provides a document centric workflow in that the state of processing work items associated with the node controls the workflow because control cannot proceed to other subsequent nodes that process the locked work item until the node holding the lock completes execution and releases the lock on the work item. Thus, access to work items controls the flow through the workflow. The workflow builder 20 provides a GUI tool to allow the user to create a document centric workflow model and translate that workflow model 24, including the defined worklists, access lists, action lists, etc., into a workflow definition language (WDL) file 10 that can be maintained and utilized in a robust workflow engine software product known in the art.

Figure 10:
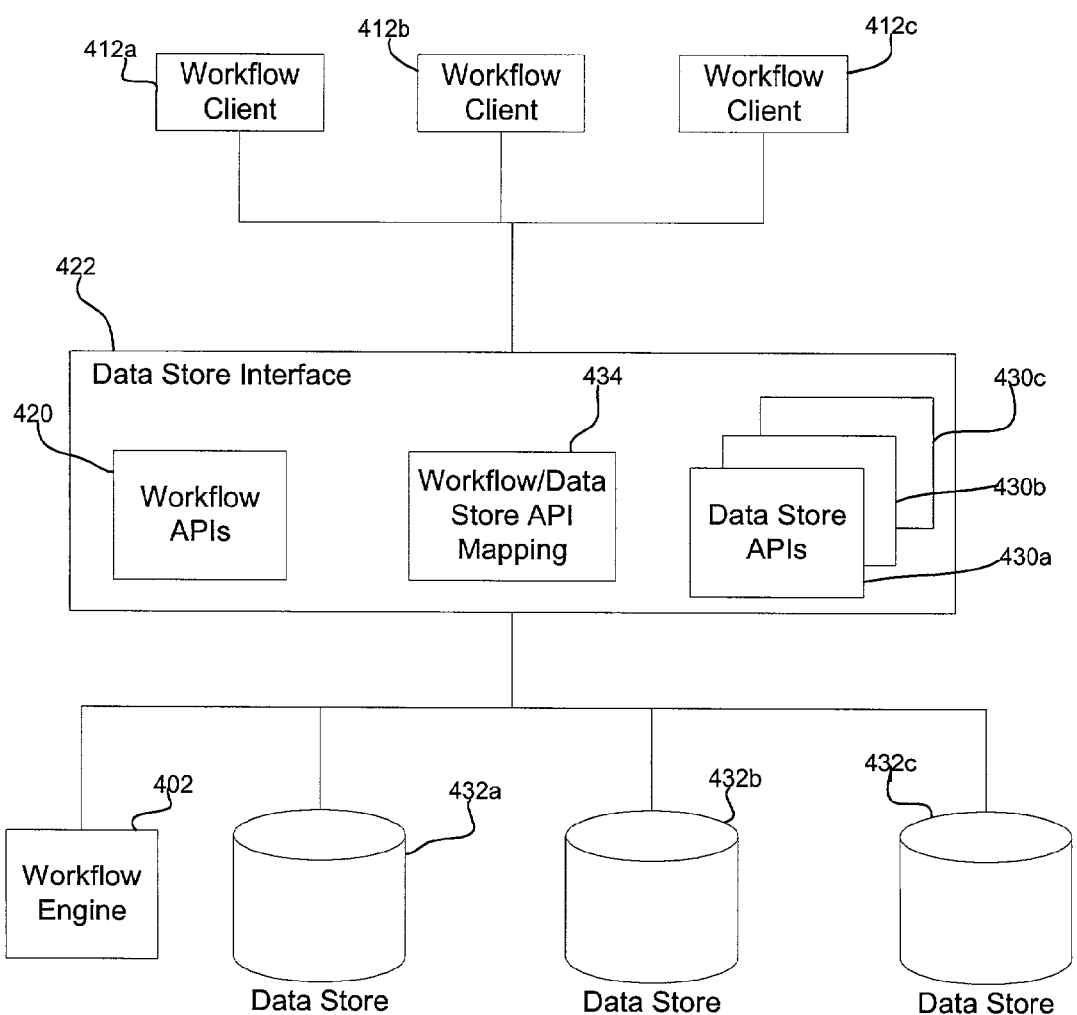
FIG. 10 illustrates a computing environment including multiple data stores storing objects in accordance with implementations of the invention.

With the described implementations, the workflow builder 20 generates a WDL file 10 that may be compatible with workflow engines from different vendors because different vendors may design their workflow engines to be compatible with the WDL format of the WDL file 10. This allows the workflow model defined in the WDL file 10 to be transportable across different vendor workflow engine platforms. Utilizing Documents from Heterogeneous Data Stores in the Workflow FIG. 10 illustrates a workflow architecture implementation in which the workflow can utilize documents from heterogeneous data stores. A workflow engine 402 may comprise the workflow engine 2 described above with respect to FIG. 1 for implementing a workflow. Workflow clients 412a, b, c may comprise the workflow clients 12a, b, c described above with respect to FIG. 1. The workflow clients 412a, b, c interface with the data store interface 422 and execute workflow APIs 420 to perform workflow related actions and activities on the workflow engine 402 that manages the workflow. A data store interface 422 allows the workflow clients 412a, b, c to use workflow APIs 420 to access objects, such as documents, multimedia files, etc., from different data stores 432a, b, c. The data stores 432a, b, c may comprise different types of repositories from different vendors. For instance, the data stores 432a, b, c may comprise databases implemented through the database programs of different vendors, e.g., Oracle Corporation, etc., or a data store product, such as the IBM Content Manager** product that manages and integrates access to scanned images, facsimiles, electronic office documents, Extensible Markup Language (XML), Hypertext Markup Language (HTML) files, computer output, audio, video, etc.

Each of the data stores 432a, b, c may be accessed using data store APIs 430a, b, c provided by the particular data store vendor. For instance, if the data store 432a, b, c comprises a database, then the data store APIs 430a, b, c would comprise the database client APIs needed to request data from a database server managing access to the database. In the case of the database, the data store APIs 430a, b, c would comprise the data store vendor's particular implementation of the Structured Query Language (SQL).

The data store interface 422 further includes a workflow/data store API mapping 434 that provides a correspondence of the workflow APIs 420 to APIs in each of the data store APIs 430a, b, c. For instance, if the workflow API requests to OPEN a document, then the workflow/data store API mapping 434 would provide the corresponding OPEN command for one of the vendor data stores API 430a, b, c. The workflow/data store API mapping 434 may use any technique known in the art to map commands from the workflow APIs 420 to one or more commands in each of the data store APIs 430a, b, c.

Figure 11:
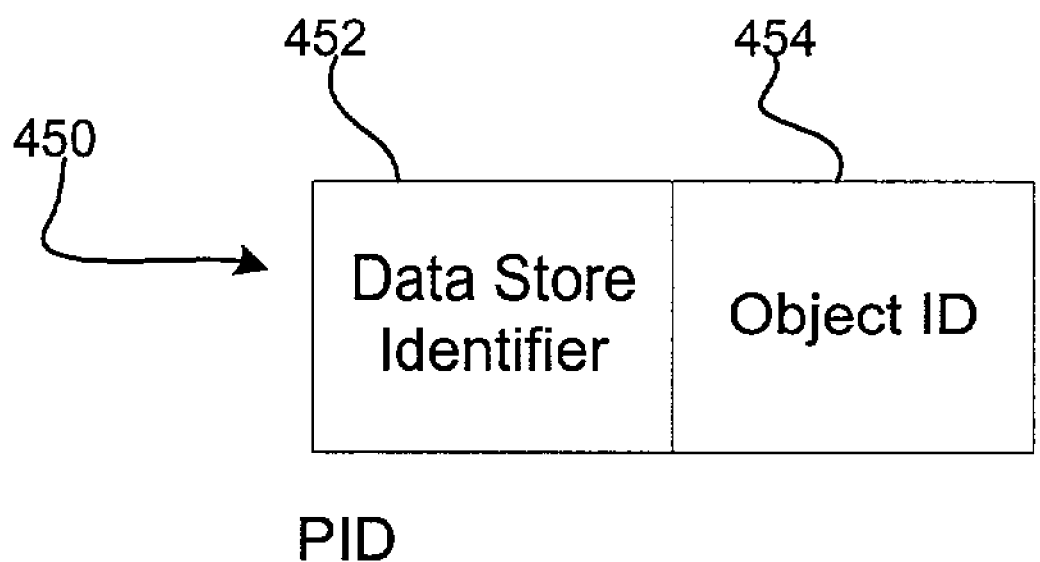
FIG. 11 illustrates a format implementation of the object identifier in accordance with implementations of the invention.

In certain implementations, objects in the data stores 432a, b, c are provided a unique identifier across all the data stores 432a, b, c, such that the unique identifier can be used to identify one object in one of the data stores 432a, b, c, referred to herein as a persistent identifier ("PID"). FIG. 11 illustrates a format of the PID 450 as including a data store identifier that provides a unique data store identifier (ID) 452 of one of the data stores 432a, b, c including the object identified by the PID. The data store ID may comprise a network address of the data store 432a, b, c, such as an alias name or an IP address. An object identifier (ID) 454 provides a unique identifier of the object identified by the PID within the data store 432a, b, c, identified in the first field 452. In this way the PID 450 provides sufficient information to allow access to a specific object in one of the data stores 432a, b, c.

Figure 12:
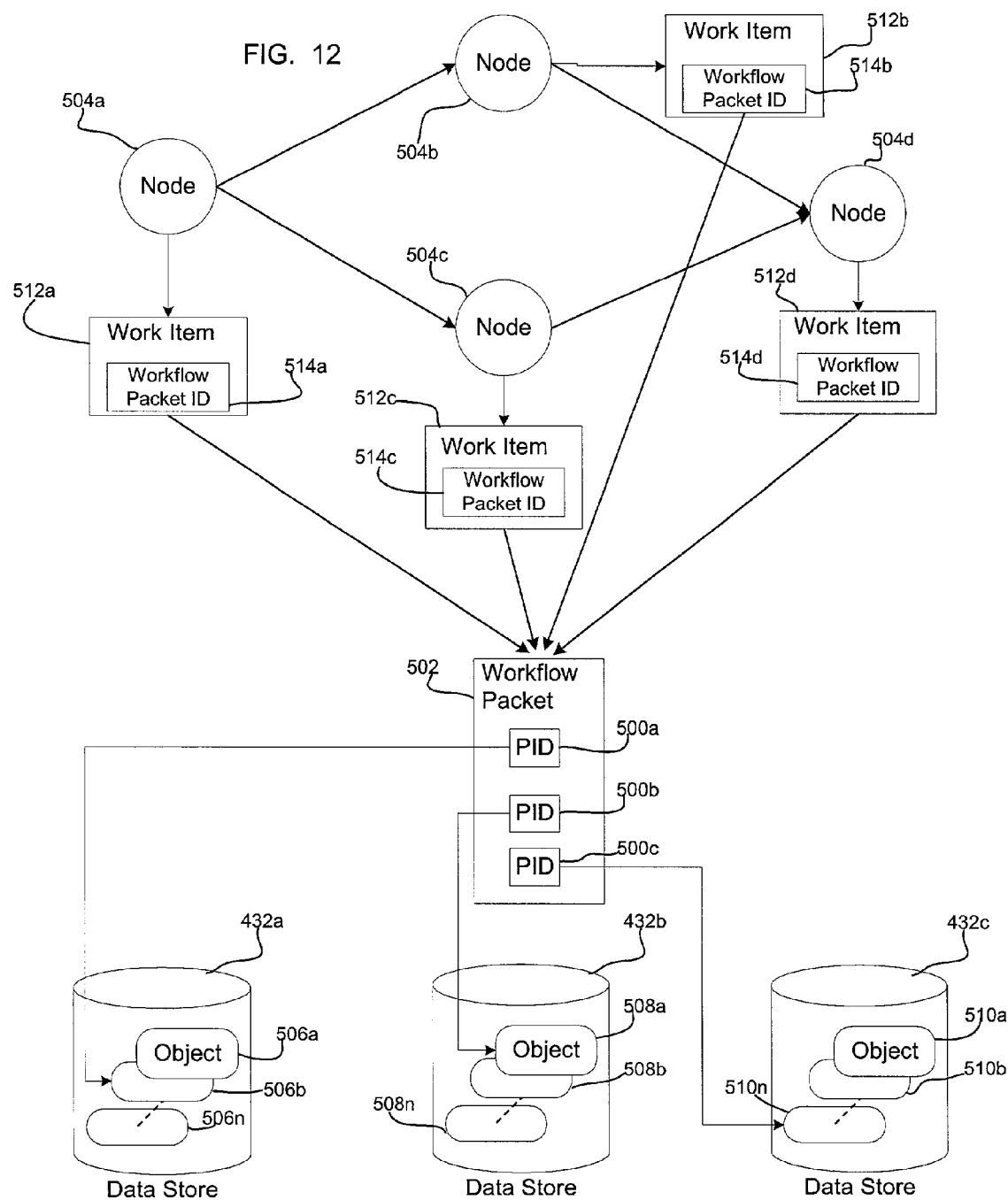
FIG. 12 illustrates further details of components used to access objects from multiple data stores in accordance with implementations of the invention.

FIG. 12 illustrates a workflow implementation utilizing the PIDs 500a, b, c in a workflow packet 502 to enable users at the nodes 504a, b, c, d to access objects 506a, b . . . n, 508a, b . . . n, and 510a, b . . . n in the data stores 432a, b, c, respectively, during execution of the workflow. The objects may comprise any type of file, including a document, multimedia file (e.g., video, audio, three-dimensional, image, graphic, etc.), database file, spreadsheet, or any other type of file known in the art. Each node 504a, b, c, d is associated with one work item 512a, b, c, d that provides the actions to perform at the node 504a, b, c, d. Each work item 512a, b, c, d includes a reference 514a, b, c, d to the workflow packet 502, indicating that one or more of the objects identified by the PIDs 500a, b, c in the referenced workflow packet 502 may be accessed and updated by a user at the node 504a, b, c, d. Thus, the user at the nodes uses the PIDs 500a, b, c included within the workflow packet 502 referenced at such nodes to access the objects 506a, b . . . n, 508a, b . . . n, 510a, b . . . n in the data stores 432a, b, c for use at the nodes 504a, b, c, d. In the described implementations, a user at a node 504a, b, c, d may modify the content of the workflow packet 502 by adding and removing PID 500a, b, c, d references.

Figure 13:
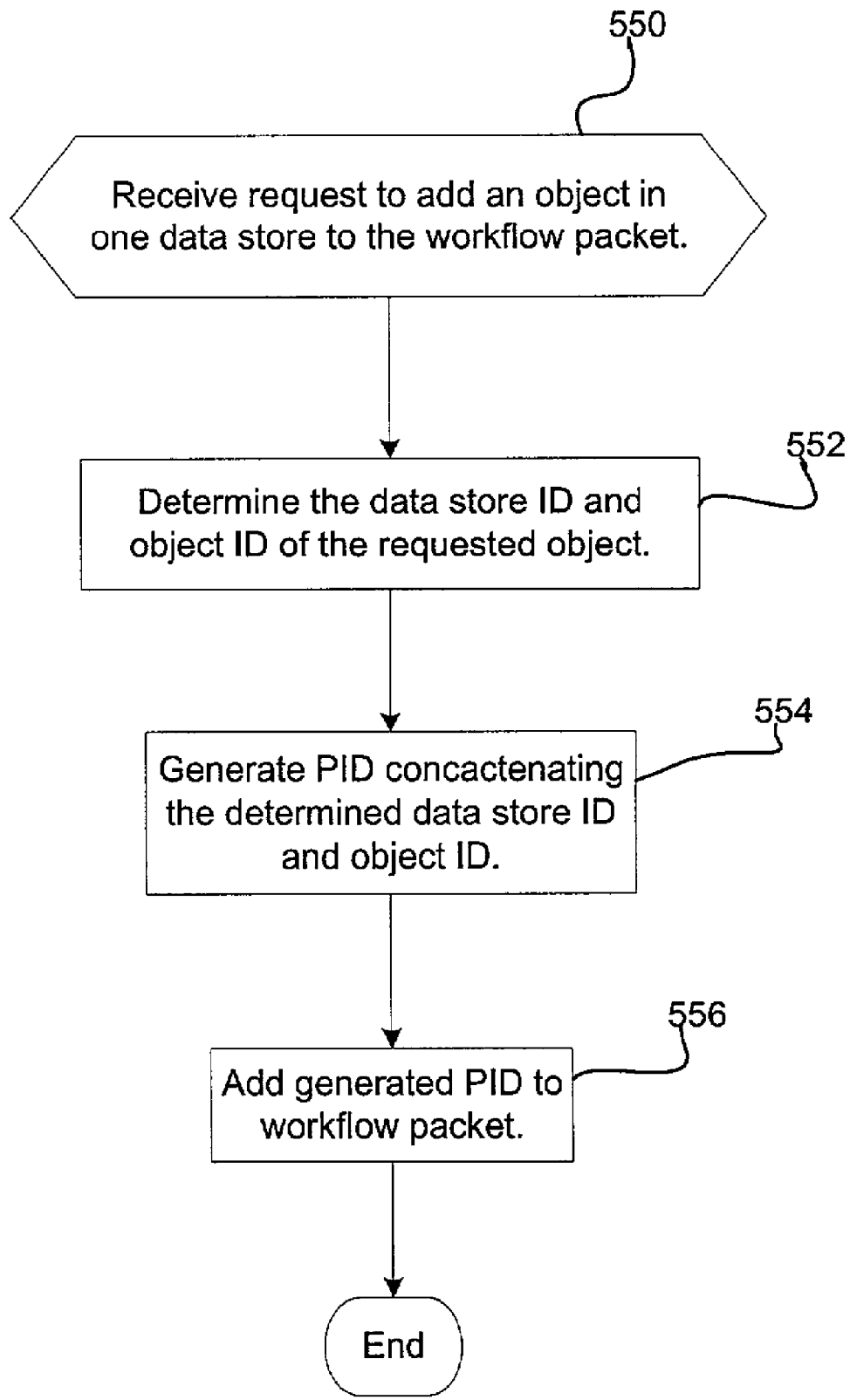
FIG. 13 illustrates logic to add objects to a workflow packet in accordance with implementations of the invention.

FIG. 13 illustrates logic implemented within the data store interface 422 to add one object 506a, b . . . n, 508a, b . . . n, 510a, b . . . n in one of the data stores 432a, b, c to the workflow packet 502. Control begins at block 550 upon receiving a request to add the object. The request may be received by a process modeler constructing the initial workflow packet 502 or by a user at one of the nodes 504a, b, c, d modifying the workflow packet 502 during workflow execution. The user requesting the modification may use workflow APIs 420 translated to data store APIs 430a, b, c to locate objects in the data stores 432a, b, c. The data store interface 422 then determines (at block 552) the data store ID 452 and the object ID 454 of the requested object 506a, b . . . n, 508a, b . . . n, 510a, b . . . n and generates (at block 554) a PID for the object to add by concatenating the determined data store ID and the object ID. The generated PID is then added to the workflow packet 502.

Figure 14:
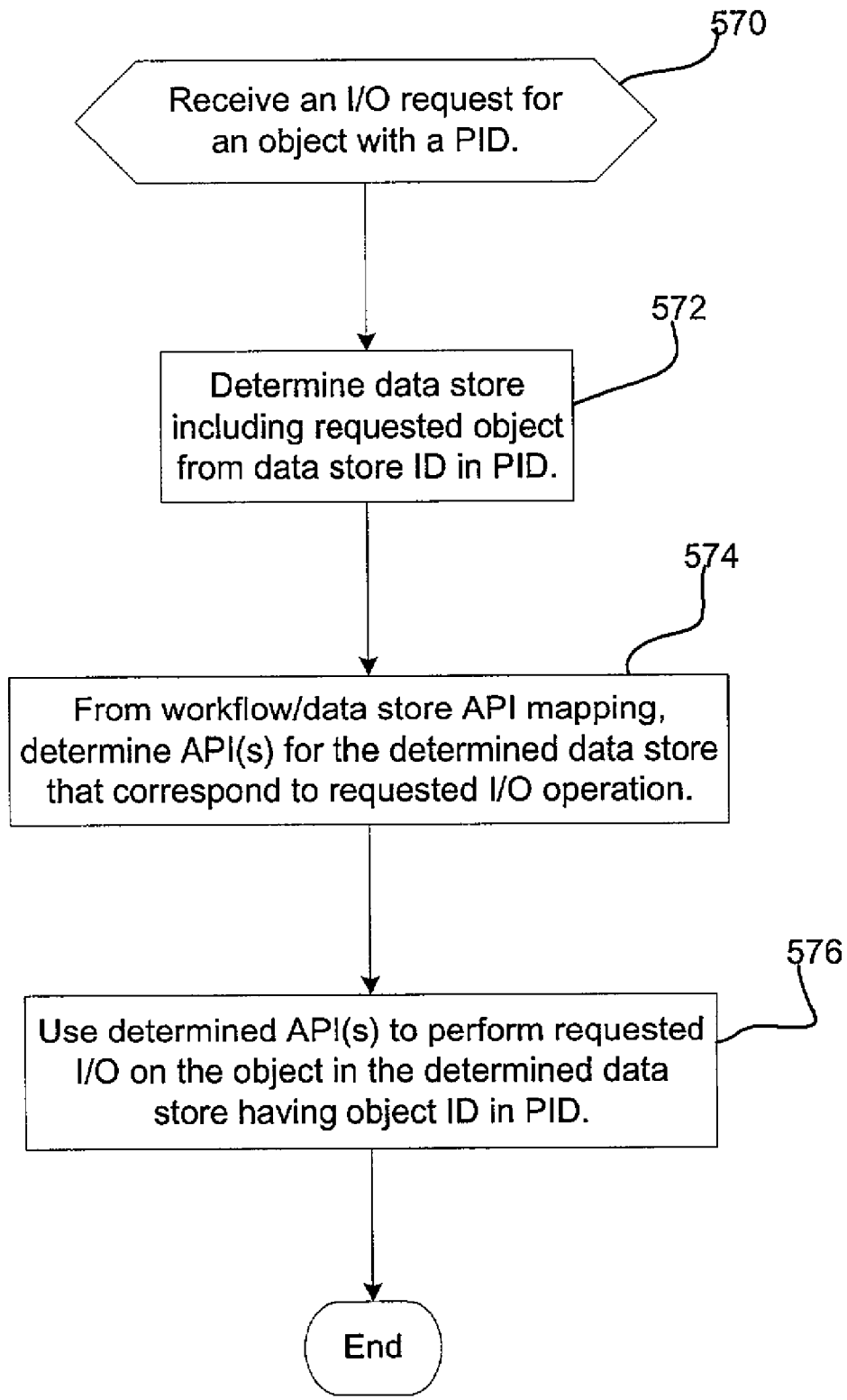
FIG. 14 illustrates logic to access objects in a workflow packet in accordance with implementations of the invention.

FIG. 14 illustrates logic implemented in the data store interface 422 to perform an Input/Output (I/O) operation on an object 506a, b . . . n, 508a, b . . . n, 510a, b . . . n identified by a PID. A user at one of the nodes may submit a workflow API for a PID to perform the requested action, such as read, write or open one the object identified by the PID. Control begins at block 570 upon receiving the I/O request for the PID. The data store interface 422 determines (at block 572) the data store 432a, b, c including the requested object from the data store ID 452 (FIG. 11) component of the received PID. The workflow/data store API mapping 434 is then processed (at block 574) to determine the API from the data store APIs 430a, b, c for the determined data store 432a, b, c that corresponds to the received workflow API. The data store interface 422 then uses the determined API to access the object 506a, b . . . n, 508a, b . . . n, 510a, b . . . n in the determined data store 432a, b, c having the ID in the object ID field 454 (at block 576).

The described implementations provide an architecture to allow the workflow clients 412a, b, c performing actions defined in a work item 512a, b, c, d at one node 504a, b, c, d in the workflow to seamlessly access any object in one of multiple heterogeneous data stores 432a, b, c, that may comprise different data store types, e.g., databases, data repositories, etc., from different vendors. The workflow client 412a, b, c uses the workflow APIs to perform I/Os with respect to a PID referencing an object in any of the data stores 432a, b, c and the data store interface 422 determines the API from the data store APIs 430a, b, for the determined data store 432a, b, c to use to execute the submitted data store APIs 430a, b, c at the data store 432a, b, c.

Further, with the described implementations, the content or documents referenced in the workflow packet at the nodes 504a, b, c, d may be modified by modifying the PIDs 500a, b, c listed in the workflow packet 502. This allows the content of the workflow packet 502 to be modified as the workflow packet 502 is being routed between the workflow nodes 504a, b, c, d.

Additional Implementation Details

The preferred embodiments may be implemented as a method, apparatus or article of manufacture using standard programming and/or engineering techniques to produce software or code. The term "article of manufacture" as used herein refers to code or logic implemented in a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The workflow client and server may be implemented within any vendor workflow program known in the art.

In the described implementations, the actions were implemented as Java methods. Alternatively, the actions may be implemented in any programming language known in the art.

In the described implementations, particular icons were used to represent different information in the workflow, such as work nodes, exit nodes, etc. However, any icon design may be used to represent the workflow components. Further, additional graphical representations may be provided for different types of work nodes, e.g., collection work nodes, assign value node, decision point node, etc.

In the described implementations, the class architecture is implemented as an object oriented class architecture. Alternatively, non-object oriented programming techniques may be used to implement the described class architecture.

In the described implementations, the data stores comprised heterogeneous data stores managed by different types of data management programs and from different vendors. Additionally, the data stores may be of a same type and from a same vendor.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for implementing a workflow comprised of nodes, comprising:
   generating a workflow packet accessed by users at the nodes in the workflow;
   receiving a request to add one target object in one of a plurality of data stores to the workflow packet, wherein each data store includes multiple objects;
   determining a first object identifier of the target object that is used to identify the target object in one data store;
   generating a second object identifier indicating the data store including the target object and the first object identifier; and
   inserting the generated second object identifier into the workflow packet, where nodes accessing objects in the workflow packet use the second object identifier to access the target object for use at the node.

2. The method of claim 1, wherein the data stores are capable of being different types of data stores and from different vendors.

3. A method of performing an Input/Output (I/O) operation on an object during execution of a workflow comprised of nodes, comprising:
   providing a plurality of objects stored in one of multiple data stores, wherein each object is identified within the data store with a first object identifier;
   providing a workflow packet referencing at least one object with a second object identifier, wherein the second object identifier indicates one of the data stores and the first object identifier of the referenced object in the data store;
   receiving, from one node, an I/O request for one target object referenced by one second object identifier in the workflow packet;
   determining from the second object identifier the data store of the target object and the first object identifier of the target object; and
   performing the I/O request on the target object at the determined first object identifier in the determined data store.

4. The method of claim 3, wherein one workflow packet is associated with a plurality of the nodes in the workflow, and wherein the nodes submit I/O requests for one or more objects referenced by the second object identifiers in the workflow packet.

5. The method of claim 1, wherein the data stores are capable of being different types of data stores and from different vendors.

6. The method of claim 3, further comprising:
   defining at least one work item for each node including a reference to the workflow packet, wherein the work item includes actions to perform with respect to at least one object in one data store referenced in the workflow packet; and
   receiving I/O requests from multiple nodes for objects referenced by second object identifiers in the workflow packet.

7. The method of claim 3, wherein the I/O request comprises a workflow I/O request, wherein each data store is accessed using data store interfaces, further comprising:
   providing a mapping of workflow I/O requests to the data store interfaces for each of the data stores, wherein each workflow I/O request maps to one or more data store interfaces for each data store, wherein the data store interfaces implement the workflow I/O requests in the data store; and
   determining from the mapping the at least one data store interface for the determined data store that implements the workflow I/O request in the determined data store, wherein the workflow I/O request is performed using the determined at least one data store interface.

8. The method of claim 7, wherein the data stores are capable of comprising different types of data stores from different vendors that utilize different sets of data store interfaces to enable access to objects in the data stores, and wherein the mapping enables the workflow I/O requests to be executed across heterogeneous data stores.

9. The method of claim 3, wherein the objects in the data store are capable of comprising documents, video files, audio files, and images.

10. The method of claim 3, further comprising:
    receiving a request, from at least one node, to add one second object identifier to the workflow packet referencing one object in one of the data stores that is not already referenced in the workflow packet, wherein subsequent nodes in the workflow are capable of accessing the object referenced by the added second object identifier.

11. The method of claim 3, further comprising:
receiving a request, from at least one node, to remove one second object identifier in the workflow packet referencing one object in one of the data stores, wherein subsequent nodes in the workflow will not be capable of accessing the object referenced by the removed second object identifier.

12. The method of claim 3, wherein the I/O request comprises a request to perform one of reading, writing or opening to the target object.

13. A system for implementing a workflow comprised of nodes, comprising:
a plurality of data stores, wherein each data store includes multiple objects;
means for generating a workflow packet accessed by users at the nodes in the workflow;
means for receiving a request to add one target object in one of the data stores to the workflow packet;
means for determining a first object identifier of the target object that is used to identify the target object in one data store;
means for generating a second object identifier indicating the data store including the target object and the first object identifier; and
means for inserting the generated second object identifier into the workflow packet, where nodes accessing objects in the workflow packet use the second object identifier to access the target object for use at the node.

14. The system of claim 13, wherein the data stores are capable of being different types of data stores and from different vendors.

15. A system for performing an Input/Output (I/O) operation on an object during execution of a workflow comprised of nodes, comprising:
a plurality of data stores, wherein each data store includes a plurality of objects, and wherein each object is identified within the data store with a first object identifier;
means for providing a workflow packet referencing at least one object with a second object identifier, wherein the second object identifier indicates one of the data stores and the first object identifier of the referenced object in the data store;
means for receiving, from one node, an I/O request for one target object referenced by one second object identifier in the workflow packet;
means for determining from the second object identifier the data store of the target object and the first object identifier of the target object; and
means for performing the I/O request on the target object at the determined first object identifier in the determined data store.

16. The system of claim 15, wherein one workflow packet is associated with a plurality of the nodes in the workflow, and wherein the nodes submit I/O requests for one or more objects referenced by the second object identifiers in the workflow packet.

17. The system of claim 15, wherein the data stores are capable of being different types of data stores and from different vendors.

18. The system of claim 15, further comprising:
means for defining at least one work item for each node including a reference to the workflow packet, wherein the work item includes actions to perform with respect to at least one object in one data store referenced in the workflow packet; and
means for receiving I/O requests from multiple nodes for objects referenced by second object identifiers in the workflow packet.

19. The system of claim 15, wherein the I/O request comprises a workflow I/O request, wherein each data store is accessed using data store interfaces, further comprising:
means for providing a mapping of workflow I/O requests to the data store interfaces for each of the data stores, wherein each workflow I/O request maps to one or more data store interfaces for each data store, wherein the data store interfaces implement the workflow I/O requests in the data store; and
means for determining from the mapping the at least one data store interface for the determined data store that implements the workflow I/O request in the determined data store, wherein the workflow I/O request is performed using the determined at least one data store interface.

20. The system of claim 19, wherein the data stores are capable of comprising different types of data stores from different vendors that utilize different sets of data store interfaces to enable access to objects in the data stores, and wherein the mapping enables the workflow I/O requests to be executed across heterogeneous data stores.

21. The system of claim 15, wherein the objects in the data store are capable of comprising documents, video files, audio files, and images.

22. The system of claim 15, further comprising:
means for receiving a request, from at least one node, to add one second object identifier to the workflow packet referencing one object in one of the data stores that is not already referenced in the workflow packet, wherein subsequent nodes in the workflow are capable of accessing the object referenced by the added second object identifier.

23. The system of claim 15, further comprising:
means for receiving a request, from at least one node, to remove one second object identifier in the workflow packet referencing one object in one of the data stores, wherein subsequent nodes in the workflow will not be capable of accessing the object referenced by the removed second object identifier.

24. The system of claim 15, wherein the I/O request comprises a request to perform one of reading, writing or opening to the target object.

25. An article of manufacture including code for implementing a workflow comprised of nodes by:
generating a workflow packet accessed by users at the nodes in the workflow;
receiving a request to add one target object in one of a plurality of data stores to the workflow packet, wherein each data store includes multiple objects;
determining a first object identifier of the target object that is used to identify the target object in one data store;
generating a second object identifier indicating the data store including the target object and the first object identifier; and
inserting the generated second object identifier into the workflow packet, where nodes accessing objects in the workflow packet use the second object identifier to access the target object for use at the node.

26. The article of manufacture of claim 25, wherein the data stores are capable of being different types of data stores and from different vendors.

27. An article of manufacture including code for performing an Input/Output (I/O) operation on an object during execution of a workflow comprised of nodes by:
- providing a plurality of objects stored in one of multiple data stores, wherein each object is identified within the data store with a first object identifier;
- providing a workflow packet referencing at least one object with a second object identifier, wherein the second object identifier indicates one of the data stores and the first object identifier of the referenced object in the data store;
- receiving, from one node, an I/O request for one target object referenced by one second object identifier in the workflow packet;
- determining from the second object identifier the data store of the target object and the first object identifier of the target object; and
- performing the I/O request on the target object at the determined first object identifier in the determined data store.

28. The article of manufacture of claim 27, wherein one workflow packet is associated with a plurality of the nodes in the workflow, and wherein the nodes submit I/O requests for one or more objects referenced by the second object identifiers in the workflow packet.

29. The article of manufacture of claim 27, wherein the data stores are capable of being different types of data stores and from different vendors.

30. The article of manufacture of claim 27, further comprising:
- defining at least one work item for each node including a reference to the workflow packet, wherein the work item includes actions to perform with respect to at least one object in one data store referenced in the workflow packet; and
- receiving I/O requests from multiple nodes for objects referenced by second object identifiers in the workflow packet.

31. The article of manufacture of claim 27, wherein the I/O request comprises a workflow I/O request, wherein each data store is accessed using data store interfaces, further comprising:
- providing a mapping of workflow I/O requests to the data store interfaces for each of the data stores, wherein each workflow I/O request maps to one or more data store interfaces for each data store, wherein the data store interfaces implement the workflow I/O requests in the data store; and
- determining from the mapping the at least one data store interface for the determined data store that implements the workflow I/O request in the determined data store, wherein the workflow I/O request is performed using the determined at least one data store interface.

32. The article of manufacture of claim 31, wherein the data stores are capable of comprising different types of data stores from different vendors that utilize different sets of data store interfaces to enable access to objects in the data stores, and wherein the mapping enables the workflow I/O requests to be executed across heterogeneous data stores.

33. The article of manufacture of claim 27, wherein the objects in the data store are capable of comprising documents, video files, audio files, and images.

34. The article of manufacture of claim 27, further comprising:
- receiving a request, from at least one node, to add one second object identifier to the workflow packet referencing one object in one of the data stores that is not already referenced in the workflow packet, wherein subsequent nodes in the workflow are capable of accessing the object referenced by the added second object identifier.

35. The article of manufacture of claim 27, further comprising:
- receiving a request, from at least one node, to remove one second object identifier in the workflow packet referencing one object in one of the data stores, wherein subsequent nodes in the workflow will not be capable of accessing the object referenced by the removed second object identifier.

36. The article of manufacture of claim 27, wherein the I/O request comprises a request to perform one of reading, writing or opening to the target object.

* * * * *